Dec. 23, 1952   F. B. HUNTER   2,622,649
LOCK NUT
Filed Feb. 5, 1948
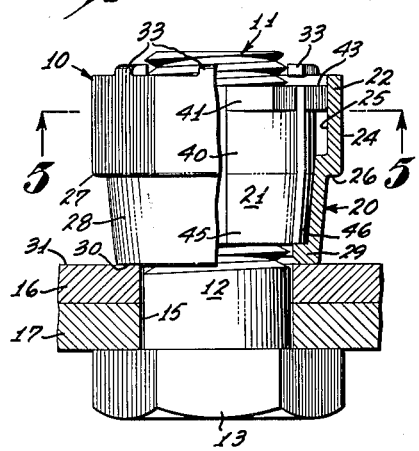
INVENTOR:
FRANK B. HUNTER
BY Huebner, Maltby, and Beehler
ATTORNEYS.

Patented Dec. 23, 1952

2,622,649

UNITED STATES PATENT OFFICE 2,622,649

LOCK NUT

Frank B. Hunter, Van Nuys, Calif.

Application February 5, 1948, Serial No. 6,400

1 Claim. (Cl. 151—19)

This invention relates to self-locking nuts of improved locking and other features.

A vast number of locknuts are known to the prior art utilizing a variety of means for achieving their commonly desired purposes. They have included the provision of a core of deformable material and as well—as in the present nut—a core axially movable within a shell against tapered surfaces intended to provide a means by which the core is restricted for clamping against a threaded bolt.

Locknuts of hitherto-known design have, as a rule, tended to be far more costly to manufacture than nuts of conventional construction, or their production has required the use of specially designed machinery and equipment. By and large they deteriorate rapidly in use and frequently are not designed to withstand repeated installations and removals nor in general to meet rigid requirements of pre-determined clamping action, continuous or, optionally, no removal torque, even distribution of stresses and the like. Moreover, for specific locking action against an assembly surface, inadequate provision was made either against scoring of such surface or adequate bearing surfaces to contain the thrust of the core and/or shell.

Self-locking nuts, if only slightly tapered, i. e., whose outer surfaces form an angle of approximately fourteen degrees or less with the axis of the nut, tend to impose such a severe burden upon the shell during the tightening process that the latter tends to burst prior to the obtaining of a preferred load tension.

In order to overcome such bursting tension, the tapered faces of the cores have frequently been provided with an angle of inclination considerably exceeding fourteen degrees, usually in the neighborhood of from fifty-five to sixty degrees. In such cases the locking action of the nut is dependent upon the forcible axial engagement of the end of the nut with the work surface, and in the event that the nut is removed slightly from such work surface, as by jarring, vibration or the like, the locking action is lost.

It is therefore an object of this invention to provide a locknut providing a predetermined degree of locking action which, once achieved, is substantially independent of the axially directed tension load of the nut.

It is another object of this invention to provide a self-locking nut which may initially be freely applied, as by hand, to a bolt thread of any length and having a final locking action achievable with a minimum wrench torque.

Another object of the invention is to provide a new and improved self-locking nut construction by which the pre-determined locking action of the nut is retained notwithstanding its separation, while on the bolt, from a work surface.

A further object of the invention is to provide a shell construction of new and improved dynamic properties.

Another further object of the invention is to provide a new and improved shell construction combining minimum mass with maximum functional strength both in the recited combination and as a specific element of invention.

Another object of the invention is the provision of new and improved cooperative end portions of a locknut core and shell for absorbing and retaining an axial load tension.

Another further object of the invention is the provision of a new and improved flexing core construction.

Yet another object of this invention is the provision of new and improved non-circular keying means between the shell and core of the nut.

It is also among the objects of this invention to provide new and improved means by which:

The core and shell of a nut having the desired characteristics set forth are retained together as an integral operative unit, To avoid injury to the cooperating surfaces of the work and of the nut portions, To enable either a locking or non-locking removal or non-locking application of the nut depending upon the direction of intentionally applied force by an operator, To provide a core having any desired degree of resilience uniformly throughout its circumference or in any specified portion of its length.

The objects of this invention moreover embrace the provision in a nut having high mass-production qualities and excellent manufacturing characteristics, a structure of great durability having properties of indefinite re-use and which, in addition, can be hand-threaded on or off a bolt prior or subsequent, respectively, to an operation of the locking means.

With these and other objects in view, the invention consists in the construction, arrangement and combination of the various parts of the device whereby the objects contemplated are attained, as hereinafter set forth, pointed out in the appended claim and illustrated in the accompanying drawings.

In the drawings:

Figure 1 is an elevational view partially in sections of a preferred form of locknut selected as embodying this invention.

Figure 2 is a plan view of the same.

Figure 3 is a sectional elevational view taken as on a line 3—3 of Figure 2.

Figure 4 is a sectional elevational view taken as on a line 4—4 of Figure 2.

Figure 5 is a plan sectional view as on a line 5—5 of Figure 1.

Figure 6 is a perspective view of the core illustrative of a preferred embodiment as used in this invention.

Figure 7 is an elevational view, in section, of another form of locknut embodying this invention.

Referring more particularly to the drawings, a locknut (Figures 1 through 6) there generally designated by the numeral 10, is shown as applied to a bolt 11 comprising a shank 12 and a head 13. The bolt 11, as shown, is extended through a bore 15 formed in a pair of sheets of metal 16 and 17 whereby to clamp the same together.

The locknut 10 generally comprises a shell 20 and a core 21, the former of which may include an upper portion 22 having a hexagonal or other polygonal or non-circular cross-section preferably defining external flat, opposed, wrench-engaging surfaces 24 and corresponding internal surfaces 25. In the preferred embodiment under discussion, an offset 26 may be formed at the apices 27 between the upper portion 22 of the shell and a lower internally and optionally externally conical portion 28. The internal face 46 of the conical portion preferably terminates in an annular shoulder 29 which at its lower end 30 engages the adjacent work surface 31.

At its uppermost end the shell may be provided as by any suitable arrangement such as a peened or inwardly turned flange 33 with means to restrain the core against axial removal from the shell and to form a packaged nut unit.

The core 21 is itself preferably formed with an upper substantially cylindrical portion 40 having a hexagonal flange 41 formed thereon most desirably at its upper end 43 in such a manner that the flange 41 slidably nests within the hexagonal recess formed by the surfaces 25, the latter collectvely defining a hexagonal cavity within the upper portion 22 of the shell.

The lower portion 45 of the core is tapered to correspond to the internal surface 46 of the shell. The core may also be formed with at least one slot 48 extending entirely through one wall thereof and throughout its length. Another slot 49 may similarly extend for only a portion of its length though preferably through a wall of the core diametrically opposite from the slot 48. If desired, the slot 49 may be extended upwardly by means of a communicating portion 50 leaving, however, an uncut bridge 51 by means of which opposite sides 53 and 54 (see Figure 6) of the core may be retained together as an integral unit. Obviously, if desired, a groove, as hereinafter described, may be substituted for the slot 49 although the resultant core will not then be so flexible. A grooved core gives a most desired result in permitting substantially uniform collapse of the core throughout its length as well as radially. More uniform locking action throughout the core length is thereby also obtained resulting in greater safety and more positive locking action in view of the relatively greater rotation required to release the nut from a locked engagement with the bolt.

As above inferred, the core may be further provided with any number of grooves 55, 56, 57 and 58 preferably positioned at the approximate centers of the corresponding surfaces 60 of the core exclusive of those surfaces where the core is instead slotted entirely through any wall from threaded bore 70 to exterior surface 45, e. g., by the slots 48 and 49.

Preferably the lower surface 75 of the core is tapered slightly, as illustrated most clearly in Figure 3, for a purpose which will appear.

*Mode of operation*

In the use of the locknut above illustrated, the parts being in their initial normal assembled relationship as illustrated, for example, in Figure 3, are so proportioned that the core 40 is in the uppermost portion of the shell with its upper surface 43 abutting and confined against the inwardly turned flange or ear 33. The lower end 75 of the core is then spaced from the corresponding upper side 76 of the shoulder 29.

In the initial assembled relation of the nut above discussed (Figure 3) the core is unconstricted and the nut may be freely threaded upon the bolt by hand or in the usual manner of a nut of conventional non-locking construction.

Upon the engagement of the work surface 31 by the bottom 30 of the shell 22, continued rotation of the nut acts to draw the core 21 downwardly by means of the bolt 11 and through the axially slidable nested, non-circular or other suitable keyed relationship of the flange 41 within the corresponding surfaces 25 of the upper portion of the shell. Manifestly, such downward movement of the core against the tapered surface 46 of the shell causes the restriction of the core throughout its length but most particularly in its lower end, as illustrated most clearly in Figure 4, where the end 75 of the core is shown in abutting relationship with the upper surface 76 of the shoulder 29.

The relationship of the tapered surfaces 45 and 46 is pre-established so that not more than the desired amount of torsional stress need be applied to the shell in conformity with the amount of desired locking or constricting action of the core against the shank 12 of the bolt. In view of the necessity, under usual conditions, of tightening the nut against the work surface 31 with greater force than is required to bring the surfaces 75 and 76 into engagement (i. e., to cause locking of the nut), the shouldered construction 29 insures that further turning of the shell, while increasing the work-engaging tension of the nut—thus drawing the parts 16 and 17 more tightly together—will avoid the application of further ordinarily destructive locking forces to the core and the bolt shank. Excessive torsional stresses normally incident to the use of locknuts of conventional construction and commonly a cause of bolt breakage, are thereby avoided.

During the constricting action of the instant nut from the time of initial relative axial movement of the core from its normal position, as shown in Figure 3, to its locked position, as shown in Figure 4, a certain amount of outward or bursting stress is placed upon the adjacent shell itself. By the instant characteristically thin construction of the shell, a certain amount of "give" compensates in part for the constriction of the core and provides an elastic limit of radial locking stress. A relatively thin shell structure is often desirable not only when the shell is made of sheet metal, as by a drawing process, but also where the shell is machined and tempered for heavier uses.

It has been found desirable, in order to improve the bearing of adjacent stress receiving surfaces—possibly due to the fact that the lower portion of the core is constricted to a somewhat greater extent than the upper portion thereof, or for the reason that the thin form of shell is distorted slightly outwardly, as above stated, or even for other reasons which may not be apparent—to taper the lower surface 75 of the core at an angle of approximately two degrees as shown. Obviously, the upper surface 76 of the shoulder 29 could be similarly tapered in lieu of the taper of the core surface 75 or each such surface, 75 and 76, could be tapered approximately one degree making the total taper between said surfaces correspond to the desired optimum. Such tapered construction in the operation of this invention brings about a uniform bearing surface between the lower end of the core and the corresponding surface 76 of the shell. Uneven wear on these parts is thereby avoided and smooth non-sticking operation injurious to bolt and nut threads, work surfaces and corresponding faces of the core and shell is avoided.

Modified form of nut

Frequently it is desired to provide a nut whose shell is substantially hexagonal throughout its length in which case the same may be formed as illustrated in Figure 7. There a locknut generally designated by the numeral 80 is provided with a shell 81 having parallel surfaces 82 throughout its length and further provided with a tapered inner or conical surface 83 against which preferably conical corresponding surfaces 84 of a core 85 may operatively slide. If desired, the core may be slotted in any desired manner on diametrically opposite sides as by slots 87 and 88. Most desirably such slots should extend to but not through an upper hexagonal or other preferably polygonal-shaped flange 90.

As in the first embodiment, the flange 90 may slide within the correspondingly-shaped upper end of the shell.

It will be noted that by virtue of the slightly tapered face 83 of the shell of the modified form, a thickened wall portion 93 is provided so as to strengthen the shell precisely at the point where greatest force is necessary to constrict the core. This reinforced construction may be used not only in ordinary installations but also and most particularly where heavy duty work is to be performed or a more than usual locking force is to be exerted upon the core.

The locknuts illustrative of this invention may be formed of any desired material and in any manner known to those skilled in the art of locknut construction or allied mechanical arts. Thus, the parts may be machined or one or both parts may be shaped by a drawing process. The shell in particular may be made of sheet metal or the like and may therefore comprise an economical stamping in those applications where stresses are not great and where a lasting locking action of non-bursting predetermined tension is of primary importance.

Manifestly, any number of longitudinal grooves may be formed in the core or the same may be slotted in one or more places to provide any degree of resilience in the core.

The angle of taper of the sides 45 and 46 is preferably such as to establish a so-called "sticking" angle between these parts so that when a locking action is obtained the same is held notwithstanding the accidental or forced separation of the lower surface of the shell from the work surface 31. As herein used, a "sticking" angle is to be taken as a total taper of from over zero to fourteen degrees unless otherwise specified.

Obviously, in removing the nut by hand the shell may be turned in the conventional manner and upon separation of the surfaces 30 and 31 to a necessary extent, axial force may be applied to the shell (downwardly as shown in Figure 1) to release the core from its constricted engagement with the bolt whereby the same is permitted to spring away from the bolt resuming its original assembled position, as illustrated in Figure 3. Thereupon, it may then be readily unthreaded from the remainder of the bolt by hand. Obviously the shell cannot be thus thrust relatively downwardly when the nut is in work-engaging relationship to the surface 31 (Figure 1) but upon unthreading the nut to clear the work surface 31, such an axial downward pressure on the shell as by striking the same will tend to unlock the nut, facilitating its removal.

Although the invention has been herein shown and described in what is conceived to be the most practical and preferred embodiment, it is recognized that departures may be made therefrom within the scope of the invention which is not to be limited to the details disclosed herein but is to be accorded the full scope of the claim so as to embrace any and all equivalent structures.

The invention having been herein described, what I claim as new and desire to secure by Letters Patent is:

A locknut comprising a wholly sheet metal shell and an internally threaded core disposed within the shell and confined therein for limited axial movement relative to the shell, said sheet metal shell having a polygonal upper portion both internally and externally thereof, opposite side wall parts of said upper portion being parallel and lying in planes parallel to the axis of the nut, said shell having a lower portion of frusto-conical external and internal configuration, the sides of said shell being offset circumferentially of the shell, said offset marking the uppermost limits of the frusto-conical lower portion and the lowermost limit of said polygonal upper portion, said frusto-conical portion tapering downwardly toward the lower end of the shell and the walls at the bottom thereof being inturned and forming a constricting annulus for limiting and sustaining the downward thrust of the core relative to and within the shell, said core having a frusto-conical lower portion complementary to the frusto-conical inner wall portion of the shell and adapted to be constricted thereby in the downward axial forced movement of the core within the shell, said core being slotted to permit constriction thereof during such downward movement thereof, the upper end portion of the core being of polygonal external configuration, nested within and complementary to the inner wall surface of the upper portion of the shell and keying the shell to the core against relative rotation and for axial slidable engagement therewith, said polygonal exterior surface of the upper portion of the core being of substantial height and providing a bearing and abutting surface for sustaining the complementary polygonal walls of the shell against wrenching forces tending to collapse and deform the shell, and means at the top of the shell confining the core within said shell.

FRANK B. HUNTER.

REFERENCES CITED

The following references are of record in the file of this patent:

UNITED STATES PATENTS

| Number | Name | Date |
|---|---|---|
| 786,725 | Bryce | Apr. 4, 1905 |
| 896,358 | Bryce | Aug. 18, 1908 |
| 1,002,185 | Shriver | Aug. 29, 1911 |
| 1,324,012 | Johnson | Dec. 2, 1919 |
| 1,891,353 | Pickop | Dec. 20, 1932 |
| 2,079,746 | Morgan | May 11, 1937 |
| 2,266,961 | Desbrueres | Dec. 23, 1941 |
| 2,355,285 | Ericsson | Aug. 8, 1944 |

FOREIGN PATENTS

| Number | Country | Date |
|---|---|---|
| 116,503 | Australia | Feb. 11, 1943 |
| 39,640 | France | Oct. 13, 1931 |